United States Patent [19]

Knoll et al.

[11] Patent Number: 5,122,573
[45] Date of Patent: Jun. 16, 1992

[54] PREPARATION OF POLYMERS HAVING TERTIARY CHLORIDE END GROUPS

[75] Inventors: Konrad Knoll, Mannheim; Klaus Bronstert, Carlsberg; Dietmar Bender, Schifferstadt, all of Fed. Rep. of Germany

[73] Assignee: BASF Aktiengesellschaft, Ludwigshafen, Fed. Rep. of Germany

[21] Appl. No.: 696,914

[22] Filed: May 8, 1991

[30] Foreign Application Priority Data

May 30, 1990 [DE] Fed. Rep. of Germany ....... 4017300

[51] Int. Cl.⁵ ............................................. C08F 8/20
[52] U.S. Cl. ................................. 525/355; 525/332.8; 525/334.1
[58] Field of Search ........................................ 525/355

[56] References Cited

U.S. PATENT DOCUMENTS 4,435,545  3/1984  Favie et al. .................... 525/355
4,513,116  4/1985  Kowalski et al. ............... 525/355

FOREIGN PATENT DOCUMENTS 2904314  8/1980  Fed. Rep. of Germany .

Primary Examiner—Bernard Lipman
Attorney, Agent, or Firm—Oblon, Spivak, McClelland, Maier & Neustadt

[57] ABSTRACT

A process for the preparation of polymers of isobutene having tertiary chloride groups by reaction of appropriate polymers which have been prepared by cationic polymerization of isobutene with hydrogen chloride.

1 Claim, No Drawings

PREPARATION OF POLYMERS HAVING TERTIARY CHLORIDE END GROUPS

It is known that the cationic polymerization of isobutene or olefinic $C_4$ cuts, i.e. polymerization by means of catalysts such as $BF_3$, can produce polymers or oligomers having terminal double bonds; cf. DE-A 2,904,314. The end groups have either the structure I: $-CH_2-C(CH_3)_2-CH_2-C(=CH_2)-CH_3$ (I) or the structure II: $-CH_2-C(CH_3)_2-CH=C(CH_3)_2$ (II). According to a non-prior proposal, hydrocarbons and hydrocarbon polymers having the structure III: $-CH_2-C(CH_3)_2-CH_2-C(CH_3)_2-Cl$ can be converted, by reaction with butadiene in the presence of $BCl_3$ and halogenated hydrocarbons, to those having end groups of the structure $-CH_2-C(CH_3)_2-CH_2-C(CH_3)_2-CH_2-CH=CH-CH_2-Cl$, which are particularly suitable for substitution reactions involving chlorine substitution.

Thus, in order to provide suitable starting materials for this reaction, it is an object of the present invention to provide a process which makes it possible to convert end groups of structures I and II into those having structure III and capable of being further functionalized with butadiene.

We have found that this object is achieved satisfactorily, from all aspects, when the hydrocarbons or hydrocarbon polymers having one of the end groups I or II are reacted, in a solvent of moderate polarity, with excess hydrogen chloride or a stoichiometric amount of aqueous thionyl chloride. This causes HCl to combine with the double bonds of the groups I or II to give, in both cases, a compound having radicals of structure III.

An example of a solvent of moderate polarity which is well suited for the reaction with hydrogen chloride is methylene chloride or a mixture of pentane and diethyl ether. For the reaction to work well, it is important that the hydrocarbon or the hydrocarbon polymer be completely soluble in the solvent and that the latter be capable of absorbing a considerable quantity of HCl. Thus pure aliphatic hydrocarbons are not suitable solvents, although a small addition of, say, 2-5% of an ether is sufficient to bind enough HCl. If it is desired to recycle the solvent and excess HCl, low-boiling halogenated hydrocarbons such as dichloromethane are particularly suitable. The reaction with thionyl chloride is also preferably carried out in methylene chloride.

The hydrochlorination can be carried out within a wide temperature range, preferably below room temperature, a range of from $-78°$ to $+20°$ C. being preferred. Toward the end of the reaction the reaction mixture should have a temperature of $0°$ C. or less, preferably $-20°$ to $-30°$ C., in order to complete the addition of HCl.

The reaction products obtained on performing the following Examples were characterized by determining the chlorine content by $^1$H-NMR spectroscopic analysis carried out using a 60 MHz analyzer by Jeol.

Determination of the $-CH_2-C(CH_3)_2-Cl-$ End Groups $^1$H-NMR spectroscopy is capable of differentiating the protons of the end group from those of the principle chain [*Polymer Bulletin* 3, 339 (1908); *Polymer Bulletin* 21, 5 (1989)]. The number-average molar mass $\overline{M}_n$ was calculated from the intensity ratio of the resonant frequencies of the terminal methyl and methylene groups ($\delta = 1.67$ and 1.96 ppm respectively) relative to non-terminal methyl and methylene groups ($\delta = 1.1$ and 1.4 ppm respectively) and was compared with the corresponding molar mass $\overline{M}_n$ as determined by gel permeation chromatography (GPC).

EXAMPLE 1

Hydrochlorination of olefine-terminated polyisobutene (PIB), prepared by polymerization of a $C_4$ cut containing 45% of isobutene in the presence of $BF_3$, as described in the Example of DE-A 2,904,314. The starting material was characterized by gel permeation chromatography giving a number-average molar mass $\overline{M}_n$ of 935 g/mole and a weight-average molar mass $\overline{M}_w$ of 1774 g/mole;

$\overline{M}_w/\overline{M}_n = 1.90$.

Hydrogen chloride gas was passed through a mixture of 50 g of PIB, 10 ml of diethyl ether and 50 ml of n-pentane for 3 hours at $-5°$ C., after which 100 g of ice were added, and the mixture containing the resulting water was shaken thoroughly. The organic phase was adjusted to neutral pH with ice-cold sodium bicarbonate solution, dried over magnesium sulfate and concentrated in vacuo. The yield was 52.18 g and the chlorine content 3.0%. The GPC results for the product are, within the limits of error, identical with those for the starting material. The $^1$H-NMR spectrum is shown in FIG. 1.

EXAMPLE 2

50 g of PIB in 50 ml of methylene chloride were reacted with hydrogen chloride for 3 hours at $-10°$ C. in a manner similar to that described in Example 1, and the reaction mixture was worked up also in a similar manner. The yield was 52.16 g and the Cl content 3.0%.

EXAMPLE 3

A mixture of 50 g of PIB, 200 ml of methylene chloride and 10 ml of thionyl chloride, to which 5.3 ml of water had been previously added, was stirred for 3 hours at $-10°$ C. The reaction mixture was worked up as described in Example 1. The yield was 52.10 g and the chlorine content 2.9%.

We claim:

1. A process for the preparation of polymers of isobutene having tertiary chloride groups, wherein appropriate polymers which have been prepared by cationic polymerization of isobutene are reacted with hydrogen chloride.

* * * * *